United States Patent [19]
Hosoe et al.

[11] Patent Number: 4,883,033
[45] Date of Patent: Nov. 28, 1989

[54] IGNITION TIMING CONTROL SYSTEM FOR INTERNAL COMBUSTION ENGINES

[75] Inventors: Katsuharu Hosoe; Teruyoshi Itoh, both of Kariya; Ryosuke Tachi, Aichi; Takao Nojiri, Chiryu, all of Japan

[73] Assignee: Nippondenso Co., Ltd., Kariya, Japan

[21] Appl. No.: 189,824

[22] Filed: May 3, 1988

[30] Foreign Application Priority Data

May 13, 1987 [JP] Japan ................. 62-116432
May 28, 1987 [JP] Japan ................. 62-132683

[51] Int. Cl.[4] ............................ F02P 5/145
[52] U.S. Cl. .................... 123/335; 123/418; 123/334
[58] Field of Search .............. 123/335, 334, 406, 417, 123/418, 630, 198 DC

[56] References Cited

U.S. PATENT DOCUMENTS

| | | | |
|---|---|---|---|
| 4,366,778 | 6/1982 | Howard | 123/334 |
| 4,492,197 | 1/1985 | Yamamoto et al. | 123/334 |
| 4,559,916 | 12/1985 | Ookawa | 123/418 |
| 4,573,440 | 3/1986 | Pischke et al. | 123/334 |
| 4,625,689 | 12/1986 | Komurasaki | 123/335 |
| 4,664,080 | 5/1987 | Minks | 123/335 |
| 4,705,001 | 11/1987 | Danno et al. | 123/339 |
| 4,712,527 | 12/1987 | Staerzl | 123/418 |
| 4,747,382 | 5/1988 | Suzuki et al. | 123/418 |
| 4,771,749 | 9/1988 | Kiuchi et al. | 123/339 |

FOREIGN PATENT DOCUMENTS 61-164077  7/1986  Japan ................. 123/335

*Primary Examiner*—Raymond A. Nelli
*Attorney, Agent, or Firm*—Cushman, Darby & Cushman

[57] ABSTRACT

A method and a system for controlling the ignition timing of internal combustion engines, or more in particular for preventing engine over-revolutions by reducing the engine speed when it becomes excessively high. The ignition timing control system is realized by a microcomputer, so that when the engine speed exceeds a predetermined high level, ignition stop operations by an ignition stop unit and ignition retard operations by a retarded ignition unit are repeated as many times as determined by the number of cylinders involved to reduce the engine speed. When the engine speed is in a predetermined high range, the ignition retardation is controlled by feedback in accordance with the engine speed, and further controlled in combination with the ignition stop as required. The method and system according to the invention is suitably used for a multi-cylinder internal combustion engine having an ignition system of electronic distribution type with a carburetor and a simultaneous ignition coil.

17 Claims, 13 Drawing Sheets

IGNITION TIMING CONTROL SYSTEM FOR INTERNAL COMBUSTION ENGINES

BACKGROUND OF THE INVENTION

1. Field of the Invention

The present invention relates to an ignition timing control system for internal combustion engines such as gasoline engines, or more in particular to an ignition timing control system for internal combustion engines having a function to prevent over-revolutions of the engines.

2. Description of the Prior Art

A phenomena known as over-revolutions of an engine, especially, those of a reciprocal engine, is a cause of such trouble as valve surge adversely affecting the engine durability. To prevent this trouble, conventional ignition systems or fuel supply systems are equipped with an over-revolutions prevention mechanism (such as disclosed in JP-A-61-164077) for retarding the ignition timing or stopping the ignition. Other conventional systems for internal combustion engines using an electronically-controlled fuel injection unit comprise means for stopping fuel injection to prevent over-revolutions. In internal combustion engines using a carburetor, on the other hand, it is very difficult to stop the fuel supply completely and therefore the very ignition is required to be stopped.

These conventional systems with an over-revolutions prevention mechanism, which operate to search for an ignition retardation angle set in advance in accordance with the engine speed in over-revolutions range, however, have the disadvantage that the over-revolutions prevention mechanism cannot be optimally operated in a versatile manner in accordance with variations in environmental conditions, secular variations or engine variations.

Another disadvantage of these conventional systems is that if ignition is stopped to prevent over-revolutions of an internal combustion engine having a carburetor using distributorless ignition (DLI) of simultaneous ignition coils (W coils), an uncombusted gas would be discharged with the engine speed reduced, with the result that the waste fire due to the simultaneous ignition would be caused at the end of exhaustion stroke after restoration of ignition, thereby igniting the uncombusted gas in the exhaustion stroke. When an intake value is opened, therefore, the uncombusted gas in the intake manifold is also ignited to cause a backfire, which is a frequent cause of a damaged intake system due to combustion and an increased pressure in the engine intake system.

SUMMARY OF THE INVENTION

The primary object of the present invention is to provide a method and a system for ignition timing control which is capable of preventing over-revolutions of an internal combustion engine with carburetor using electronic distribution, that is distributorless ignition accurately without any backfire.

A second object of the present invention is to provide a method and a system for controlling the ignition timing of an internal combustion engine, which is capable of controlling the engine speed successfully under variations of environmental conditions, secular variations or physical variations between different engines.

In order to achieve the first object, there is provided according to the present invention an ignition timing control system for multi-cylinder internal combustion engines for controlling the ignition timing electronically in accordance with the operating conditions of the engines, comprising means for stopping ignition, means for retarding the ignition timing, and engine speed-responsive control means for energizing the ignition stop means and the ignition angle retarding means alternately each several times when the engine speed is in a predetermined range.

In this way, the ignition of each cylinder is stopped until the required reduction is attained in engine speed without stopping each cylinder twice in row. In other words, the ignitions are stopped as many times as the cylinders. After this process, the ignition for the cylinders is restored at a retarded ignition timing, whereby an abrupt torque change is dampened while at the same time reducing the increase in engine speed. These processes of ignition stop and the retarded ignition are repeated alternately.

In order to achieve the second object, there is provided according to the present invention an ignition timing control system for internal combustion engines for controlling the ignition timing electronically in accordance with the operating conditions, comprising means for detecting the engine speed of an internal combustion engine, ignition lag control means energized only in a region beyond a first set value of the speed of the internal combustion engine detected by the engine speed detection means for controlling by feedback the ignition lag as predetermined in accordance with the prevailing engine speed, the ignition lag being increased with the engine speed in the region and decreased with the decrease in engine speed in the region, and ignition stop means energized when the engine speed is at a second set value higher than the first set value for stopping the ignition.

In this way, the ignition timing is gradually retarded in a first engine speed region, and depending on the change in engine speed after retardation, is further retarded or advanced. Specifically, the ignition timing is controlled by feedback in accordance with the change in engine speed. Especially when the engine is under load, an over-revolutions can be prevented only by retardation, thereby making possible a control with substantially no shock. Further, feedback control of ignition timing permits optimum ignition timing in accordance with changes in operating conditions, etc.

According to another aspect of the present invention, there is provided a method of ignition timing control for internal combustion engines, comprising the steps of detecting the engine speed of a multi-cylinder internal combustion engine, sequentially stopping the ignition of the cylinders of the multi-cylinder internal combustion engine when the engine speed exceeds a predetermined level, igniting the cylinders by sequential retardation of ignition timing after stopping ignition for all the cylinders, and repeating the ignition stop and retardation alternately as long as the engine speed is higher than a predetermined level.

According to still another aspect of the invention, there is provided a method of ignition timing control for internal combustion engines, comprising the steps of detecting the engine speed of an internal combustion engine, controlling the ignition lag by feedback in such a manner that the ignition lag is increased when the engine speed is increased and the ignition lag is reduced when the engine speed is decreased in accordance with the engine speed changes in the case where the engine speed is higher than a predetermined first engine speed level, and stopping the ignition and retarding the ignition timing alternately when the engine speed is higher than a second predetermined engine speed level which is higher than the first engine speed.

BRIEF DESCRIPTION OF THE DRAWINGS

FIGS. 2 to 4 are flowcharts for explaining an ignition control system according to a first embodiment of the present invention, in which FIG. 2 is a flowchart showing an ignition interruption routine, FIG. 3 a flowchart for deciding on engine speed conditions, and FIG. 4 a flowchart for calculating the ignition timing.

FIGS. 9 to 11 are flowcharts for explaining the operation of an ignition timing control system according to a third embodiment of the present invention, in which FIG. 9 is a flowchart for ignition interrruption routine, FIG. 10 a flowchart for deciding on the engine speed conditions, and FIG. 11 a flowchart for calculating the ignition timing.

DESCRIPTION OF THE PREFERRED EMBODIMENTS

An ignition timing control system for internal combustion engines embodying the present invention will be explained below in detail.

Figure 1:
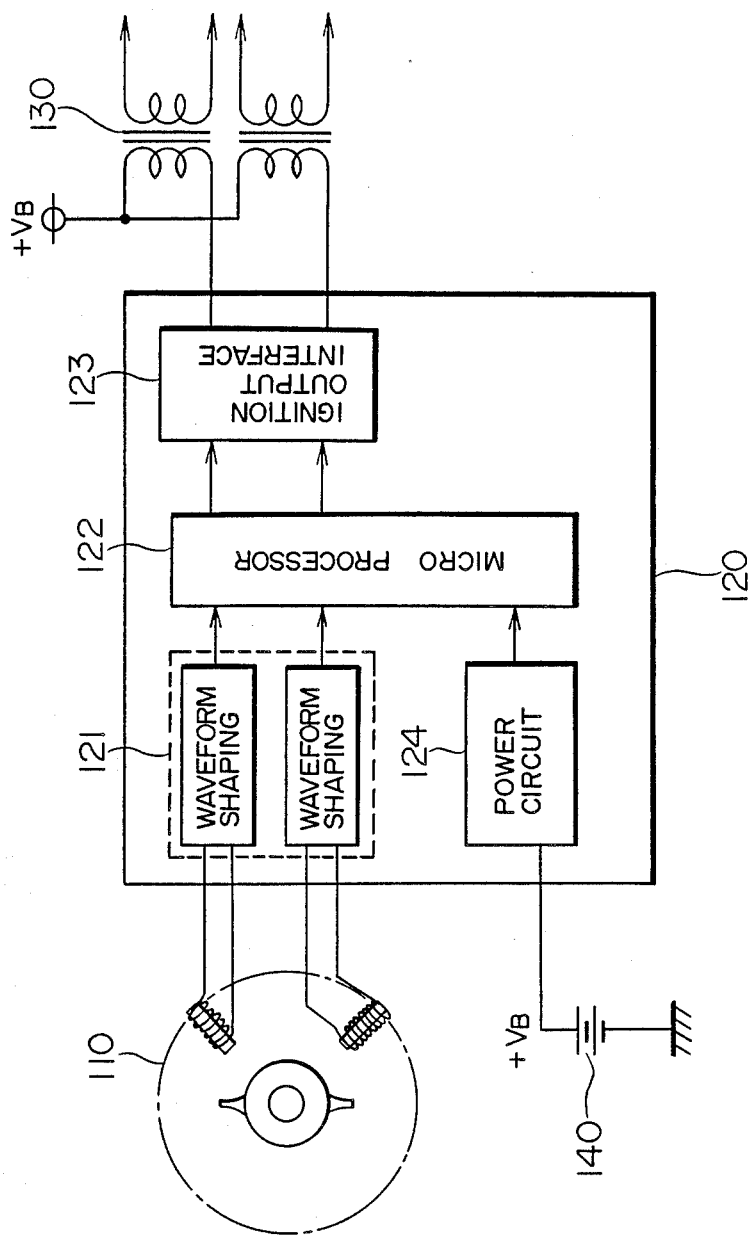
FIG. 1 is a block diagram showing a configuration of an ignition system for internal combustion engines to which the present invention is applicable.

FIG. 1 shows an embodiment of an ignition system of electronic distribution type using simultaneous ignition coils for a four-cylinder gasoline engine with carburetor. In FIG. 1, reference numeral 110 designates a crank angle sensor for detecting an angular position of engine rotation, numeral 120 an ignition timing control unit, numeral 121 a waveform shaping circuit for shaping an output signal of the crank angle sensor 110, numeral 122 a microprocessor for computing the ignition timing, energization time, over-revolutions control, etc. in accordance with a signal from the crank angle sensor 110 and producing a signal for de-energizing the ignition coils, and numeral 123 an ignition output interface including a power transistor or the like for energizing and de-energizing the ignition coils in response to a signal produced from the microprocessor 122. Numeral 124 designates a power circuit for supplying power from a battery 140 to other circuits, and numeral 130 ignition coils of simultaneous starting type. The terminals of the secondary of the ignition coils 130 are connected with ignition plugs of different cylinders.

Figure 2:
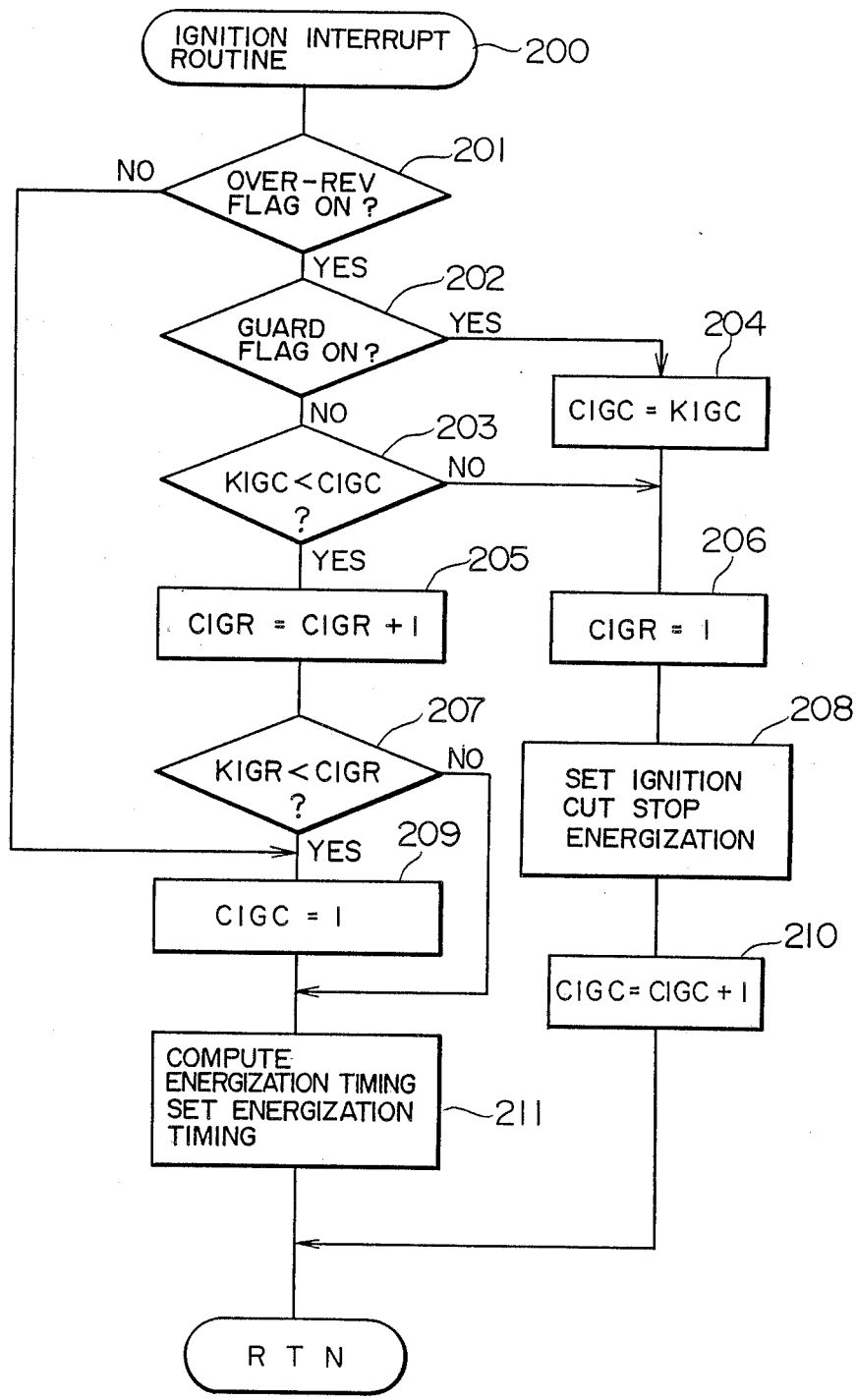

A control method using the ignition timing control system 120 according to a first embodiment will be explained with reference to the flowcharts of FIGS. 2 to 4. The flowchart of FIG. 2 represents a routine 200 which is started by interruption each time of ignition to compute an energization start time for the next ignition cycle and set an energization start timing. First, step 201 decides whether an over-revolutions flag is on, that is, whether the present engine speed (speed of revolution) is within a range of over-revolutions control. If the decision is "Yes", the process proceeds to step 202. The step 202 determines whether or not the guard flag is on, and if the decision is "Yes", the process proceeds to step 204. If the decision is "No", on the other hand, the process proceeds to step 203, where it is decided whether the count CIGC of the ignition stop counter is larger than the number of ignition stops KIGC. According to this embodiment involving a four-cylinder engine, the number of ignition stops KIGC is four. As a result, if the number of ignition stops is less than four, the decision is "No", and the process is passed to step 206. Step 206 clears the count CIGR of the retardation ignition counter, and the process proceeds to step 208. At step 208, the setting of an energization start timing is excluded to stop the next ignition, whereby the energization of the ignition coil 130 is stopped thereby to stop the ignition. After that, the process is passed to step 210, where the ignition stop counter is counted up by one from the count CIGC for restoration. These steps are repeated until the number of ignition stops reaches the number of cylinders involved. When the number of ignition stops reaches the number of cylinders involved, that is, the operation for four ignitions is completed, the step 203 decides "Yes", and the process proceeds to step 205. At step 205, the count CIGR of the retardation angle ignition counter is counted up by one, followed by the step 207. Step 207 decides whether the number of retarded ignitions is larger than the number of retarded ignitions KIGR set above the number of cylinders. The number of retarded ignitions KIGR is set to a number above the number of cylinders in such a manner the ignition is not stopped successively for two or more times for a cylinder and the engine speed is not increased excessively at the same time. In the case of a four-cylinder engine, this number is at least four. Also, an abrupt torque change is dampened to prevent an excessive engine speed increase by retarding the ignition timing. According to the embodiment under consideration, the number of ignitions is set to four. If step 207 decides "No", that is, a retarded ignition is involved, the process proceeds to step 211. Step 211 calculates the energization timing, which is set and restored. This process is repeated in the case of a retarded ignition. When the retarded ignition reaches the last of a predetermined number of ignitions, step 207 branches into "Yes", followed by step 209. Step 209 sets the count CIGC of the ignition stop counter to 1, followed by step 211 for conducting similar control.

In this way, when the engine speed is within the speed range set as over revolutions, the ignition stop and retarded ignition may be repeated alternately for each cylinder, whereby ignition stop and retarded ignition are alternated with each other for a single cylinder.

Now, the decision on over-revolutions will be explained with reference to FIG. 3. The flowchart shown in FIG. 3 represents a routine 300 generating an interruption at the fall of an Ne signal (engine speed signal) produced from the crank angle sensor 110. Step 301 decides whether the engine speed is higher than a first set level $Ne_{MIN}$ which is a low limit of the over-revolutions range. If the engine speed is lower than the first set level $Ne_{MIN}$, the process branches to "Yes", followed by the step 302. Step 302 clears the over-revolutions flag, followed by step 306 where the guard flag is turned off for restoration. In this case, "No" is the decision at step 201 of the flowchart of FIG. 2, and the process proceeds to step 209 for the process similar to the one described above, but no ignition stop or retarded ignition is effected.

If step 301 decides that the engine speed is higher than the first set level $Ne_{MIN}$, the process branches to "No" toward step 303. Step 303 decides whether the engine speed is higher than the second set level $Ne_{MAX}$ which is higher than the first set level $Ne_{MIN}$ (100 rpm higher in this embodiment). If it is decided that the engine speed is lower than the second set level $Ne_{MAX}$, the process branches to "Yes", followed by step 306 to clear the guard flag for restoration. As a result, previous condition is held without changing the over-revolutions flag or guard flag. In the case where step 303 decides that the engine speed is higher than the second set level $Ne_{MAX}$, the process branches to "No" to the step 304 for turning on the over-revolutions flag. After that, the process proceeds to step 305 where the third set engine speed level Ne guard which is set an allowable limit of engine speed is compared with the actual engine speed. If step 305 decides that the engine speed is lower than the third set engine speed level Ne guard, the process branches to "Yes", while if it is decided that the engine speed is higher than the third set level Ne guard, the process branches to "No" followed by step 307 for turning on the guard flag and returns to RTN. The operation with the guard flag on will be explained with reference to the flowchart to FIG. 2. Step 202 in FIG. 2 decides whether or not the guard flag is on, and if it is on, the process branches to "Yes" to step 204, where the number of ignition stops KIGC is set to the count CIGC of the ignition stop counter. After that, the process proceeds to step 206 for performing the ignition stop process similar to that described above.

Now, the ignition timing calculation routine 400 will be explained with reference to the flowchart of FIG. 4. FIG. 4 shows an ignition timing computation section making up the main routine. Step 401 reads and computes the basic ignition timing ($\theta_{ig}$) based on the engine speed from the ignition timing table prepared in accordance with the engine speed. After that, the process is passed to step 402 for deciding whether or not the over-revolutions flag is on, and if it is off, the process returns to route. If the over-revolutions flag is on, on the other hand, the process proceeds to step 403 where the retard angle amount ($\Delta\theta R$) is subtracted from the basic ignition timing. In the embodiment under consideration, the retard angle amount ($\Delta\theta R$) is set to such a value that the result of computation is BTDC 5°CA (crank angle). Instead of subtracting the retard angle ($\Delta\theta R$) from the basic ignition timing ($\theta_{ig}$), an ignition timing value retarded in advance may be used as the basic ignition timing.

Figure 5:
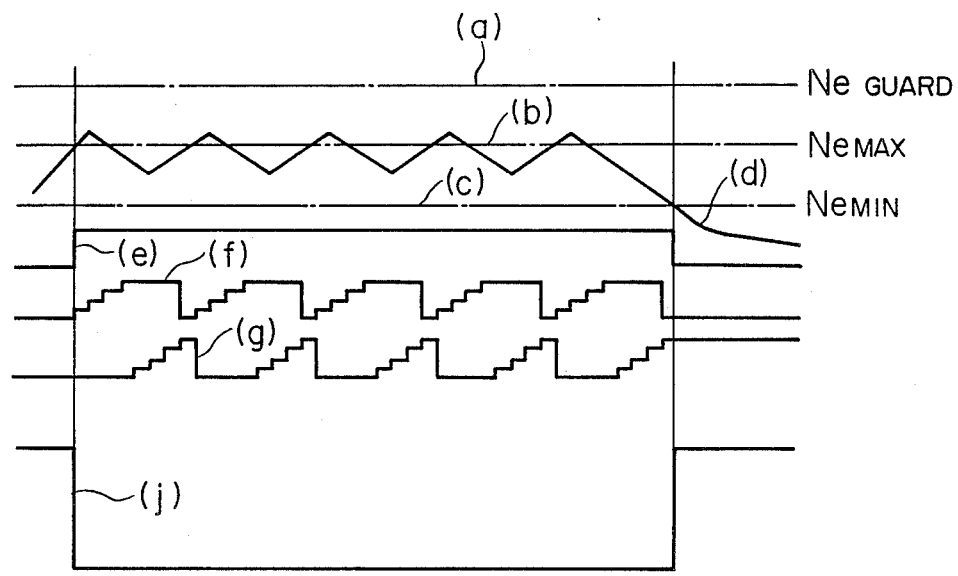
FIGS. 5 and 6 are timing charts showing the operating conditions of an ignition timing control system according to the first embodiment.
Figure 6:
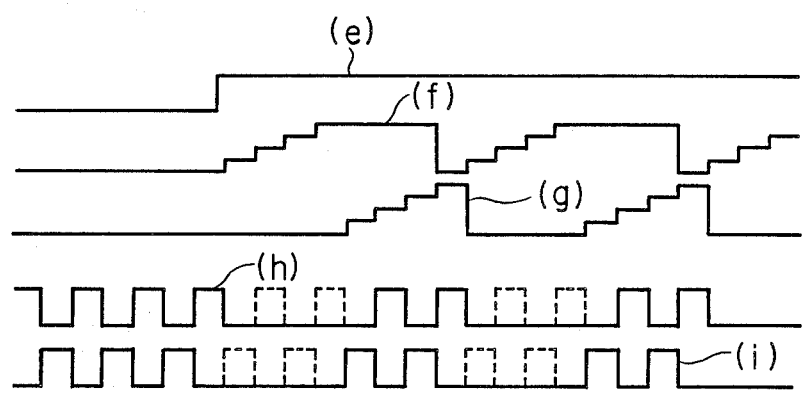

Now, the actual operating conditions will be explained with reference to the time chart shown in FIGS. 5 and 6. FIGS. 5 and 6 show the conditions of the engine subjected to over-revolutions control under no load. In FIGS. 5 and 6, (a) represents the third set engine speed Ne guard, (b) the second set engine speed $Ne_{MAX}$, (c) the first set engine speed $Ne_{MIN}$, (d) approximate engine speed, (e) over-revolutions flag, (f) the count CIGC of the ignition stop counter, (g) the count CIGR of the retard angle ignition counter, (h) and (i) an energization cut-off signals to the simultaneous ignition coil 130, and (j) the ignition timing. In this embodiment using a four-cylinder for explanation, two simultaneous ignition coils 130 are used to produce energization and cut-off signals respectively.

First, when the engine speed (d) increases and exceeds the second set speed (b), the over-revolutions flag (e) is turned on. With the turning on of the over-revolutions flag (e), the ignition stops first of all. Then, the count (f) of the ignition stop counter is counted up to stop both the energization signals (h) and (i). The two energization signals are stopped for two ignitions respectively, so that each cylinder stops one ignition thereof. When the over-revolutions flag is turned on, the ignition timing (j) is set to a retarded ignition timing. When the count CIGC (f) of the ignition stop counter exceeds a predetermined number of items (four in the present embodiment), the operation is switched to the retarded angle ignition. Upon switching to the retarded angle ignition, the energization signals (h) and (i) are applied to the ignition coil 130, thereby counting up the count CIGR of the retarded ignition counter. When the count CIGR of the retarded angle ignition counter reaches a predetermined number (four or more ignitions in this embodiment), the ignition is stopped again. This ignition stop and retarded angle ignition are repeated alternately as long as the engine speed (d) is in the range for over-revolutions control, that is, in the range between the first set speed (c) and the third set speed (a). When the engine speed (d) lowers below the first set level (c) with the increase in the load or by throttle operation, the over-revolutions flag (e) is cleared thereby to restore the ignition timing, etc. to normal condition.

In the case where over-revolutions cannot be prevented by the above-mentioned operation with the engine speed remaining higher than the third set level Ne guard, the ignition is kept off.

As explained above, both over-revolutions and back fire can be prevented by repeating the ignition stop and retarded angle ignition alternately as many times as the number of cylinders within a predetermined range of engine speeds.

The control operation for preventing over-revolutions has been performed only by repeating the ignition stop and retardation as many times as the number of cylinders in the foregoing embodiment. This method of control may of course be applied with other methods of control.

Figure 7:
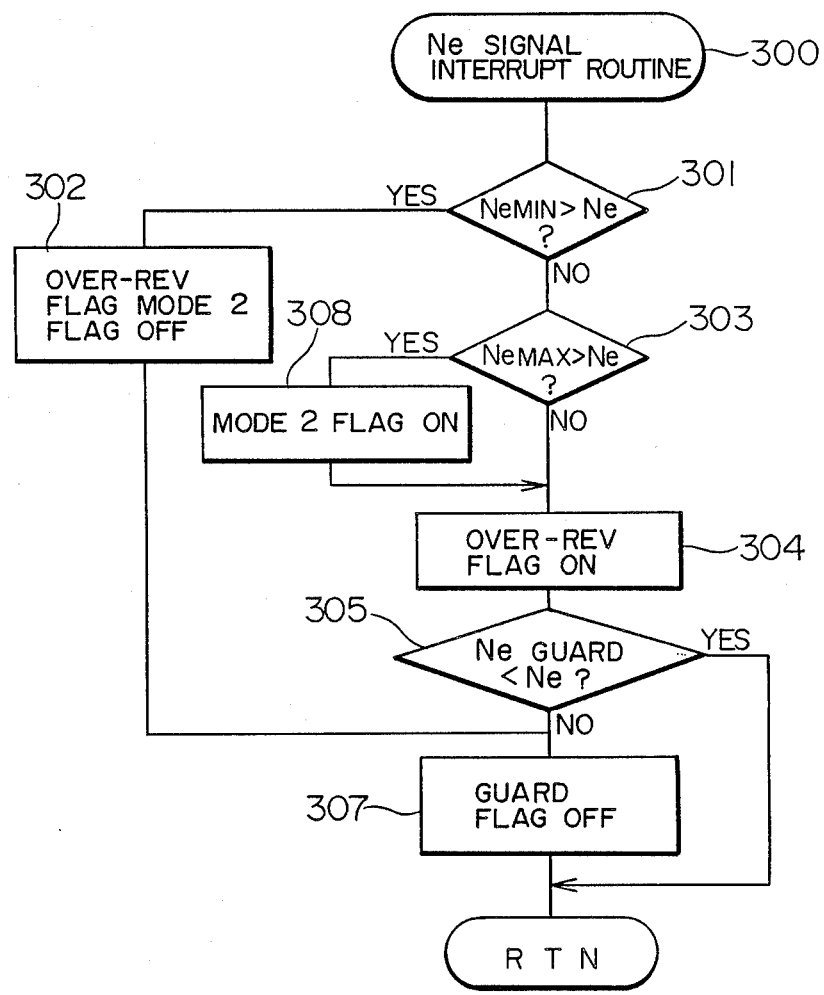
FIG. 7 is a flowchart similar to FIG. 3 for explaining the operation of an ignition timing control system according to a second embodiment of the present invention.
Figure 8:
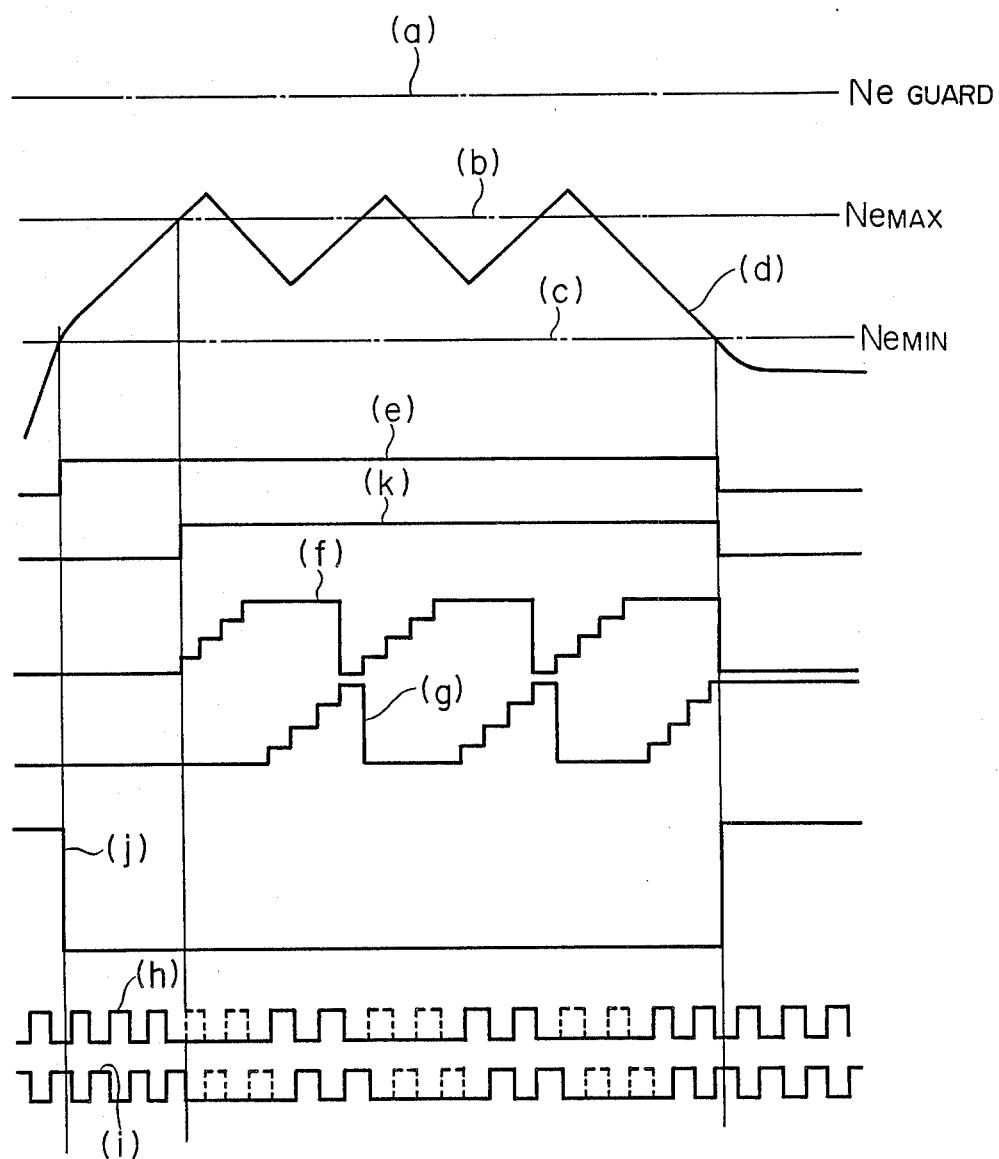
FIG. 8 is a timing chart showing the operating conditions of the ignition timing control system according to the second embodiment.

A method of control according to a second embodiment is shown in FIGS. 7 and 8. FIG. 7 is a flowchart showing an example, and FIG. 8 a timing chart thereof.

Figure 3:
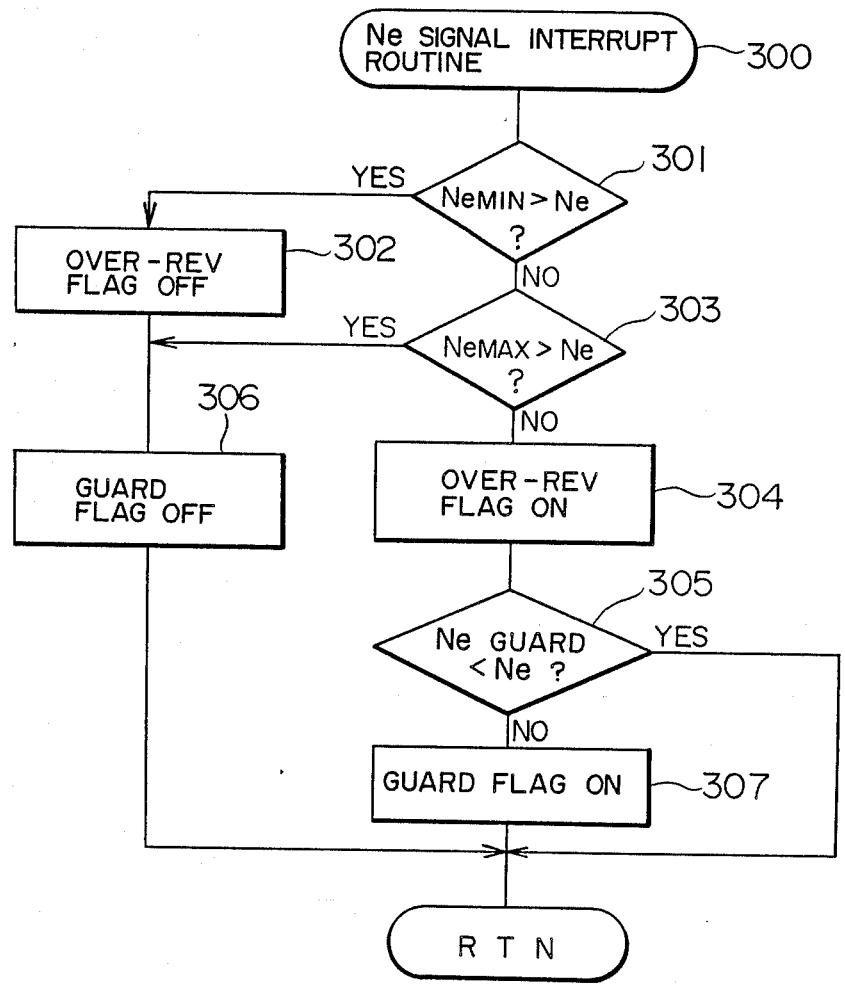
Figure 4:
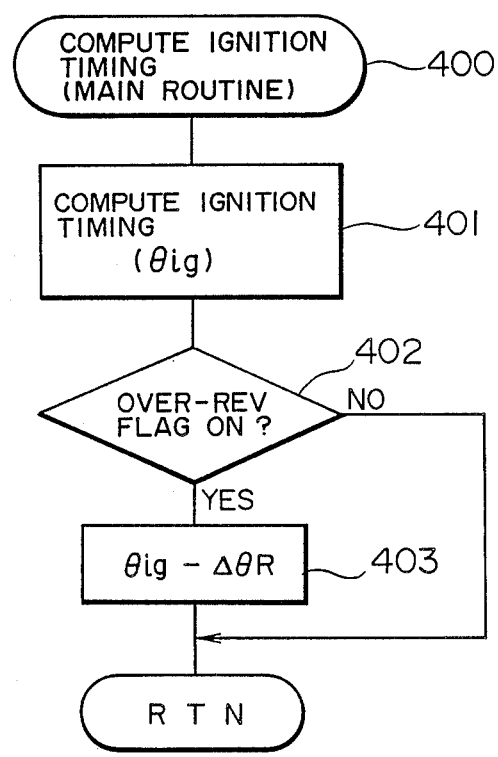

In FIG. 7, if the decision at the engine speed decision step 303 in the Ne signal interrupt routine of FIG. 3 is "Yes", the process proceeds to a newly added step 308 to turn on a mode 2 flag. When this mode 2 flag is on, a combined ignition stop and retardation control is effected, while if the mode 2 flag is off with the over-revolutions flag on, only the retardation is effected. Also, step 302 turns off both the over-revolutions flag and the mode 2 flag.

FIG. 8 is a timing chart for such a control. During a first control section, that is, where $Ne_{MIN} < Ne < Ne$-

$Ne_{MAX}$, only the retardation of the ignition timing is carried out. By adding this control to the control process mentioned above, a sudden torque change or shock occurred at the time of starting the over-revolutions control are alleviated.

The reference symbols (a) to (j) in FIG. 8 are identical to those in FIGS. 6 and 7, and (k) represents the mode 2 flag.

According to the embodiment described above, in the case where the engine speed is included in the range of over-revolutions control, the ignition stop and the retarded ignition are repeated as many times as the number of cylinders involved (four in the case of the present embodiment). In the case of a single-cylinder engine, the ignition stop and the retarded ignition are alternated with each other. Even when the uncombusted gas is generated in the exhaust stroke by the ignition stop, such a gas, as long as it is caused by a single misfire, does not start a fire with the waste fire generated in the exhaust stroke by the simultaneous ignition coil 130 due to the effect of the residual gas or the like. As a result, the over-revolutions can be prevented without generating any backfire. Also, in restoring the ignition, the ignition is restarted at the retarded ignition timing, whereby a sudden torque change of the engine, and hence, an abrupt increase in engine speed is prevented, thereby reducing the engine vibrations or shock against running.

In each of the aforementioned embodiments, the number of times by which ignition is stopped successively is not necessarily as many as the cylinders, but may be once if smaller than the number of cylinders. The number of times by which the ignition timing is retarded, on the other hand, may not necessarily be the same as the number of cylinders, but may be more than the number of cylinders, to the extent that the ignition for the same cylinder is not stopped successively number of times.

The application of the present invention is not limited to an internal combustion engine with carburetor and ignition coils, but it may be used also with an internal combustion engine with electronically-controlled fuel injection or an ignition coil for a plurality of cylinders, or a distributor with the equal effect of over-revolutions prevention.

Figure 9:
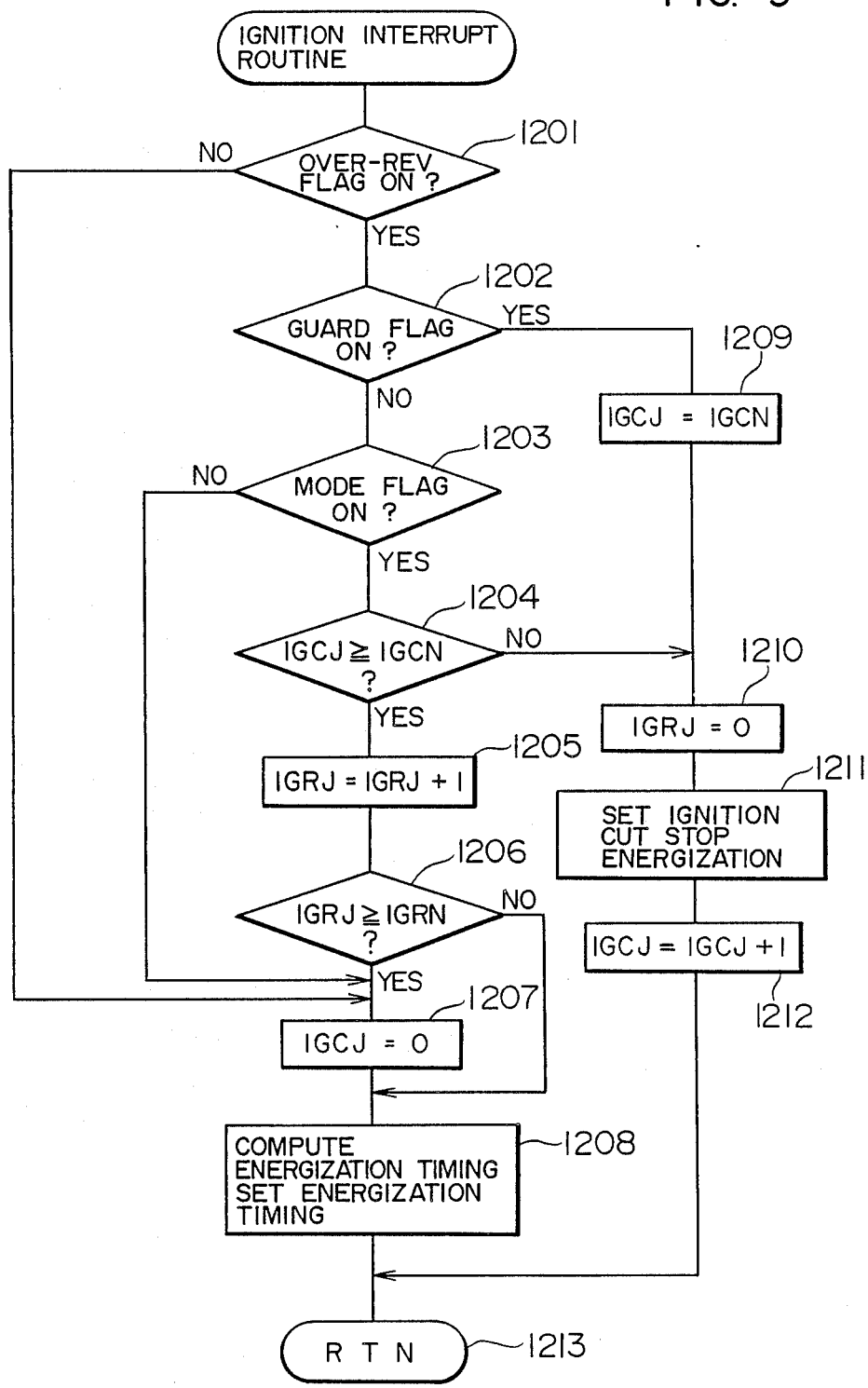

A method of control with the ignition timing control system 120 according to a third embodiment will be explained with reference to the flowchart shown in FIGS. 9 to 11. The flowchart of FIG. 9 represents a routine for computing an energization start time for the next ignition and setting the energization start time upon generation of an interruption for each ignition. First, step 1201 decides whether or not the over-revolutions flag is on, that is, whether the engine speed is in the over-revolutions control range. If the decision is "Yes", the process proceeds to step 1202. Step 1202 decides whether the guard flag is on, and if it is on, the process is passed to the step 1209 to set the ignition stop number IGCN to the count IGCJ of the ignition stop counter. If the decision is "No", on the other hand, the process proceeds to step 1203 for deciding whether the mode flag is on, that is, whether the ignition timing feedback mode or the ignition stop plus retarded ignition mode. If the decision is "No", the process proceeds to step 1207, while if the answer is "Yes", that is, the ignition stop plus retarded ignition mode, the process proceeds to step 1204. Step 1204 decides whether the count IGCJ of the ignition stop counter is larger than the set number of ignition stops IGCN. Since a four-cylinder engine is involved, and IGCN is four. Therefore, if the number of ignition stop revolutions is less than four, the decision is "No", and the process branches to step 1210. Step 1210 clears the count IGRJ of the retarded ignition counter, followed by step 1211, and in order to stop the next ignition, the setting of the energization start time is ceased. As a result, the ignition coil 130 is de-energized thereby to stop the ignition. After that, the process is passed to the step 1212 for returning to RTN. The foregoing steps are repeated until the number of ignition stops equals the number of cylinders.

When the number of ignition stops reaches the number cylinders, that is, when four ignitions are stopped completely, step 1204 decides as "Yes", and branches to step 1205. Step 1205 counts up the count IGRJ of the retarded ignition counter by one, followed by step 1206. Step 1206 decides whether or not the number of retarded ignitions is larger than the number IGRN of retarded ignitions set to more than the number of cylinders. The number of retarded ignitions is set to a number equal to or more than the number of cylinders in such a manner that two or more ignitions are not stopped for the same cylinder and that the engine speed is not increased excessively. Therefore, the number is set to four of more for a four-cylinder engine. By retarding the ignition timing angle, on the other hand, an abrupt torque change is prevented thereby to prevent an excessive increase in engine speed. The number of retarded ignitions is set to four in the embodiment under consideration. If step 1206 decides as "No", that is, when retarded ignitions are involved, the process branches to step 1208. Step 1208 computes the energization timing and returns to the route. This process is repeated for retarded angle ignition. At the last of a predetermined number of retarded ignitions, step 1206 branches to "Yes" to step 1207. Step 1207 sets the ignition stop counter IGCJ to zero, followed by step 1208.

In this manner, when the engine speed is at the second set speed level in the range of over-revolutions, the ignition stop and retarded ignition are repeated by the number of cylinders. In the case where the engine has a single cylinder, an ignition stop is alternated with a retarded ignition.

Now, the decision on over-revolutions will be explained with reference to FIG. 10. The flowchart shown in FIG. 10 represents a routine for generating an interrupt at the fall of the Ne signal produced from the crank angle sensor 110. Step 1301 detects the engine speed from the intervals of generation of Ne signal, and in order to decide whether the engine speed is increasing or decreasing, the previous detected engine speed $Ne_{OLD}$ is subtracted from the present detected engine speed $Ne_{NEW}$ thereby to determine an engine speed change amount $\Delta Ne$. Step 1302 decides whether the engine speed is higher than the first set level $Ne_{MIN}$ which is a low limit of the range for the over-revolutions control, and if the engine speed is lower, the process branches to "No" to step 1303. Step 1303 clears the guard flag, over-revolutions flag and the mode flag and the restore the route. In the process, step 1201 in FIG. 9 decides as "No", followed by step 1207 but neither retardation feedback nor ignition step plus retarded angle ignition is executed.

If the engine speed is higher than $Ne_{MIN}$, step 1302 branches to "Yes" to step 1304 for deciding whether engine speed is lower than the second set level $Ne_{MAX}$. If the decision at step 1304 is "No", the process proceeds to step 1305 for turning on the mode flag followed by step 1306.

If step 1304 decides as "Yes", the process is passed to step 1306. Step 1306 turns on the over-revolutions flag. Step 1307 decides whether the engine speed is higher than the third set engine speed Ne guard, and if the decision is "Yes", the process proceeds to step 1309 to turn on the guard flag. If the decision at step 1307 is "No", on the other hand, the process is passed to step 1308 for clearing the guard flag and the process returns to the main routine.

The operation with the guard flag on will be explained. The decision at step 1202 in FIG. 9 is "Yes", and the process proceeds to step 1209 where the set number of ignition stops IGCN is set in the count IGCJ of the ignition stop counter. After that, the process proceeds to step 1210 to perform the processes mentioned below. Specifically, while the guard flag is on, the ignition is kept off.

In the aforementioned embodiment, the engine speeds $Ne_{MIN}$ and $Ne_{MAX}$ and the Ne guard are set at intervals of 100 rpm with the value of $Ne_{MAX}$ set to the over-revolutions preventing speed of 4600 to 5000 rpm. Nevertheless, these values may be set at any desired figures in accordance with the engine type involved. Also, each flag is not cleared unless the engine speed lowers below $Ne_{MIN}$.

Figure 11:
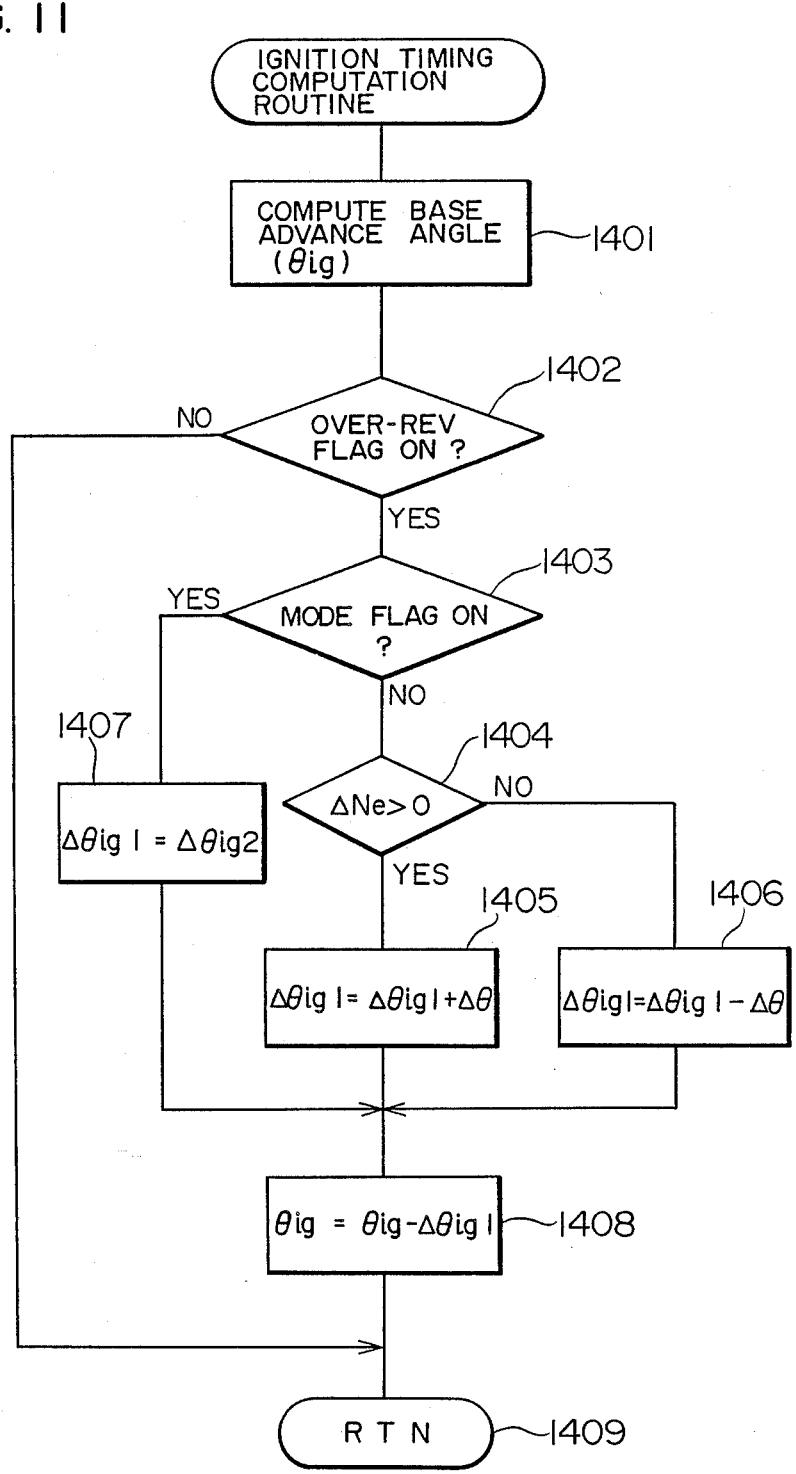

Now, the computation of the ignition timing will be explained with reference to FIG. 11 showing an ignition timing computation section of the main routine. Step 1401 searches for and computes a basic ignition timing ($\theta_{ig}$) based on engine speed from a table of ignition timing specified for each engine speed. Step 1402 decides whether the over-revolutions flag is on, if the decision is "No", the route is restored. If the decision is "Yes", on the other hand, the process proceeds to step 1403. Step 1403 decides whether the mode flag is on, and the decision is "Yes", the process branches to step 1407. Step 1407 sets a predetermined retard angle $\Delta\theta_{ig}2$ as a retard angle execution value $\Delta\theta_{ig}1$ followed by step 1408 for setting a predetermined retard ignition timing. If step 1403 decides as "No", the mode of ignition timing feedback is started followed by step 1404. Step 1404 decides whether the value $\Delta Ne$ is positive, that is, whether the engine speed is on the increase or not on the basis of $\Delta Ne$ computed at step 1301, and if the decision at step 1404 is "Yes", the ignition timing compensation value $\Delta\theta$ is added. Specifically, the retard ignition is continued, and the process proceeds to step 1408, followed by similar steps.

If the decision at step 1404 is "No", that is, if the engine speed is on the decrease, the process proceeds to step 1408 for subtracting the retard angle compensation value $\Delta\theta0$ from $\Delta\theta_{ig}1$ thereby to retard by $\Delta\theta$, followed by step 1408. In the embodiment under consideration, $\Delta\theta_{ig}2$ is set so that the result of computer is BTDC5°CA, and the learning value $\Delta\theta$ is set to 2A. $\Delta\theta_{ig}2$ may be a value of ignition timing retarded in advance as a replacement of the basic ignition timing, and $\Delta\theta$ may be set in accordance with engine characteristics.

Figure 12:
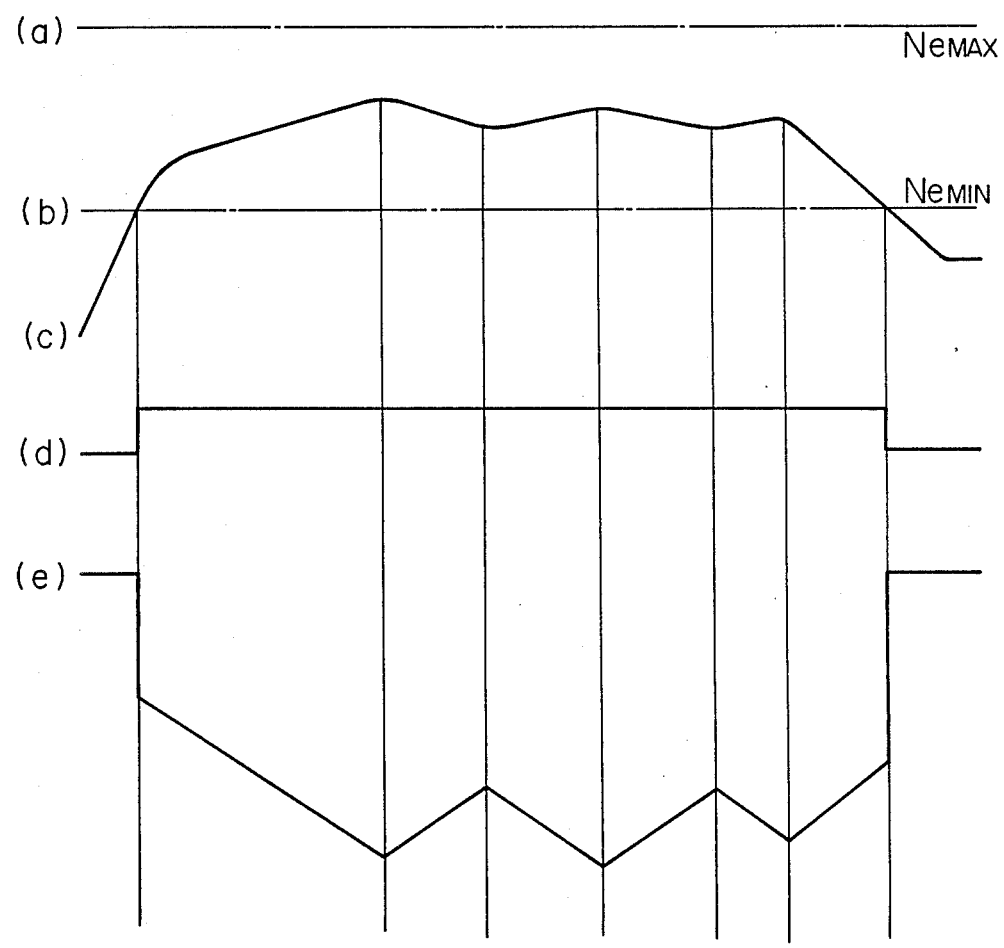
FIG. 12 is a timing chart showing the operating conditions of an ignition timing control system according to a third embodiment of the present invention.

Now, actual operating conditions will be explained with reference to FIGS. 12 and 13. FIG. 12 shows a condition under over-revolutions prevention control for the engine under load, and FIG. 13 that under no load. In FIG. 12, (a) represents the second set engine speed $Ne_{MAX}$, (b) the first set engine speed $Ne_{MIN}$, (c) the engine speed, (d) an over-revolutions flag, and (e) the ignition timing. With the increase in engine speed (c) exceeding the first set level $Ne_{MIN}$, the over-revolutions flag (d) is turned on, and the ignition timing is set to $\theta_{ig}-\Delta\theta_{ig}1$. After that, if the engine speed further increases, the ignition timing is further retarded, and vice versa. If the engine speed continues to decrease to such a level below the first set engine speed $Ne_{MIN}$, the over-revolutions flag is cleared with the ignition timing returned to the basic ignition timing $\theta_{ig}$.

Figure 13:
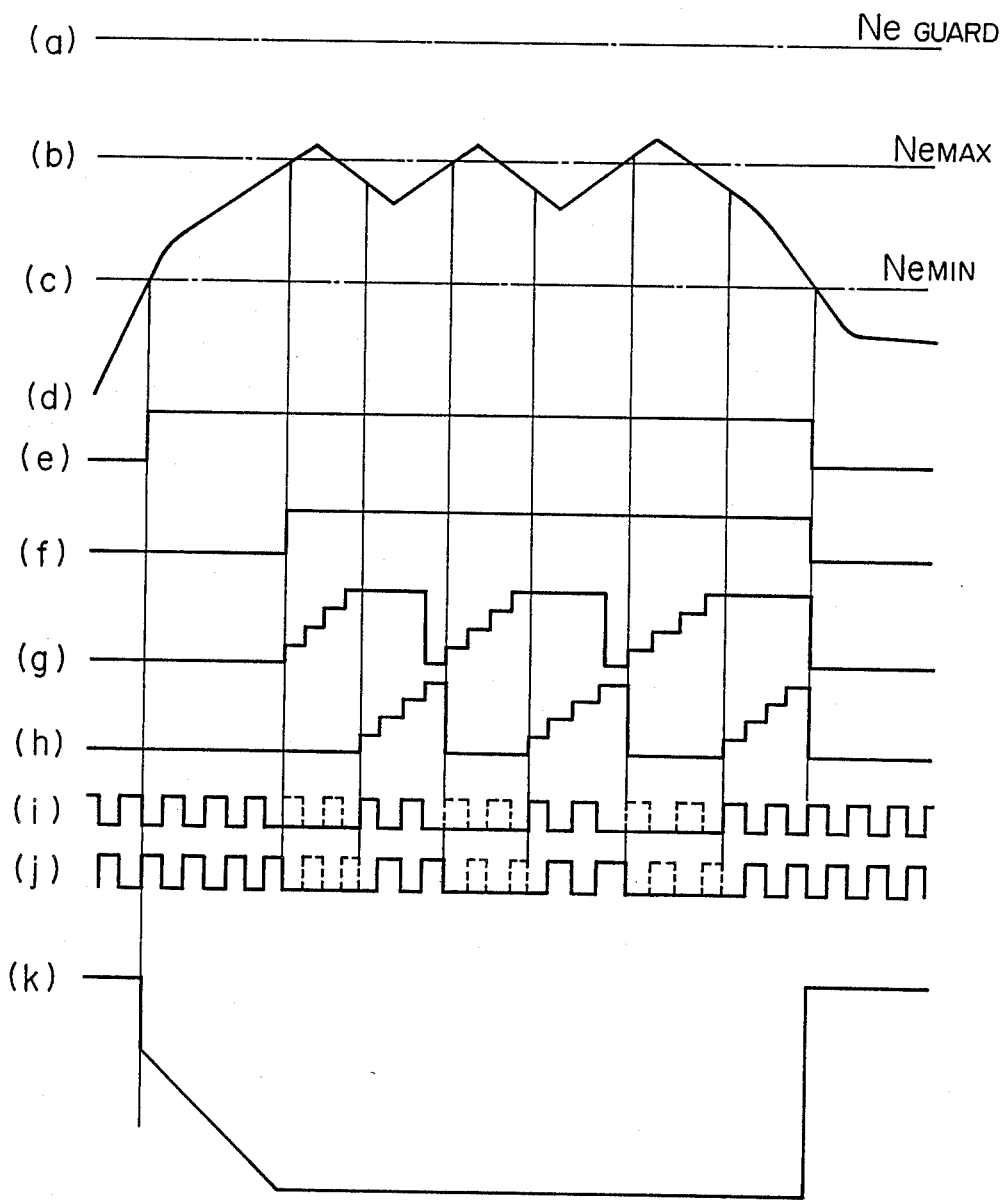
FIG. 13 is a timing chart showing the operating conditions of an ignition timing control system according to the third embodiment with the engine under no load.

In FIG. 13, (a) represents the third set engine speed Ne guard, (b) the second set engine speed $Ne_{MAX}$, (c) the first set engine speed $Ne_{MIN}$, (d) the engine speed, (e) the over-revolutions flag, (f) the mode flag, (g) the count value of the ignition stop counter, (h) the count value of the retarded angle ignition counter, and (i), (j) the energization signals of the ignition coil 130, and (k) the ignition timing. In this embodiment using two simultaneous ignition coils, there are two energization signal lines.

With the engine speed (d) increasing beyond the first set level, the over-revolutions flag is turned on, and the ignition timing is retarded gradually. With further increase in engine speed exceeding the second set level, the mode flag is turned on, and as many ignition stops as the set ignition number is executed. In the meantime, the count value (g) of the ignition stop counters is counted up, and the energization signals (i) and (j) are stopped. When the mode flag is turned on, the ignition timing (k) is set to a retarded ignition timing. When the ignition stop counter (g) exceeds a set value, the ignition is retarded with the energization signals produced, and the count value (h) of the retarded ignition counter is counted up. Upon execution of a predetermined number of retarded ignitions, ignition is stopped again. This process is repeated as long as the engine speed between the second and third engine speed settings. After that, with the engine speed decreasing to below the first set engine speed level, both the over-revolutions flag and the mode flag are cleared, so that the ignition timing is restored to normal level.

As explained above, the retarded ignition with feedback control of the ignition timing is effected in the first engine speed range, and the ignition stop and retarded angle ignition are repeated as many times as the number of cylinders involved in the second engine speed range, whereby the over-revolutions preventing control is made possible with substantially no shock, while at the same time preventing generation of a backfire.

According to the present embodiment, when the engine speed is in the range of over-revolutions control range, the engine under load is capable of maintaining the engine speed simply by ignition timing retardation, and therefore by retarding the ignition timing slowly and with retard or advance feedback control in accordance with engine speed changes, a sudden torque change of the engine can be prevented, while at the same time preventing the over-revolutions at an ignition timing suited to the prevailing engine conditions. Also, when the engine is free of load where retardation of ignition timing is not sufficient to prevent over-revolutions, a second control method is used by repeating ignition stops and retardation of ignition timing. In the process, if the engine has a single cylinder, an ignition stop is alternated with an ignition timing retardation. As a result, even if an ignition stop generated an uncombusted gas in the exhaust stroke, no ignition occurs with a waste fire in the exhaust stroke generated by the simultaneous ignition coil to the extent that the uncombusted gas is generated by a single ignition stop. Thus, the over-revolutions is prevented without any backfire. At the same time, ignition restoration by retardation prevents a sudden increase in engine speed which otherwise might be caused by sudden torque change, thereby reducing the engine vibrations and the shock against the driving.

Figure 14:
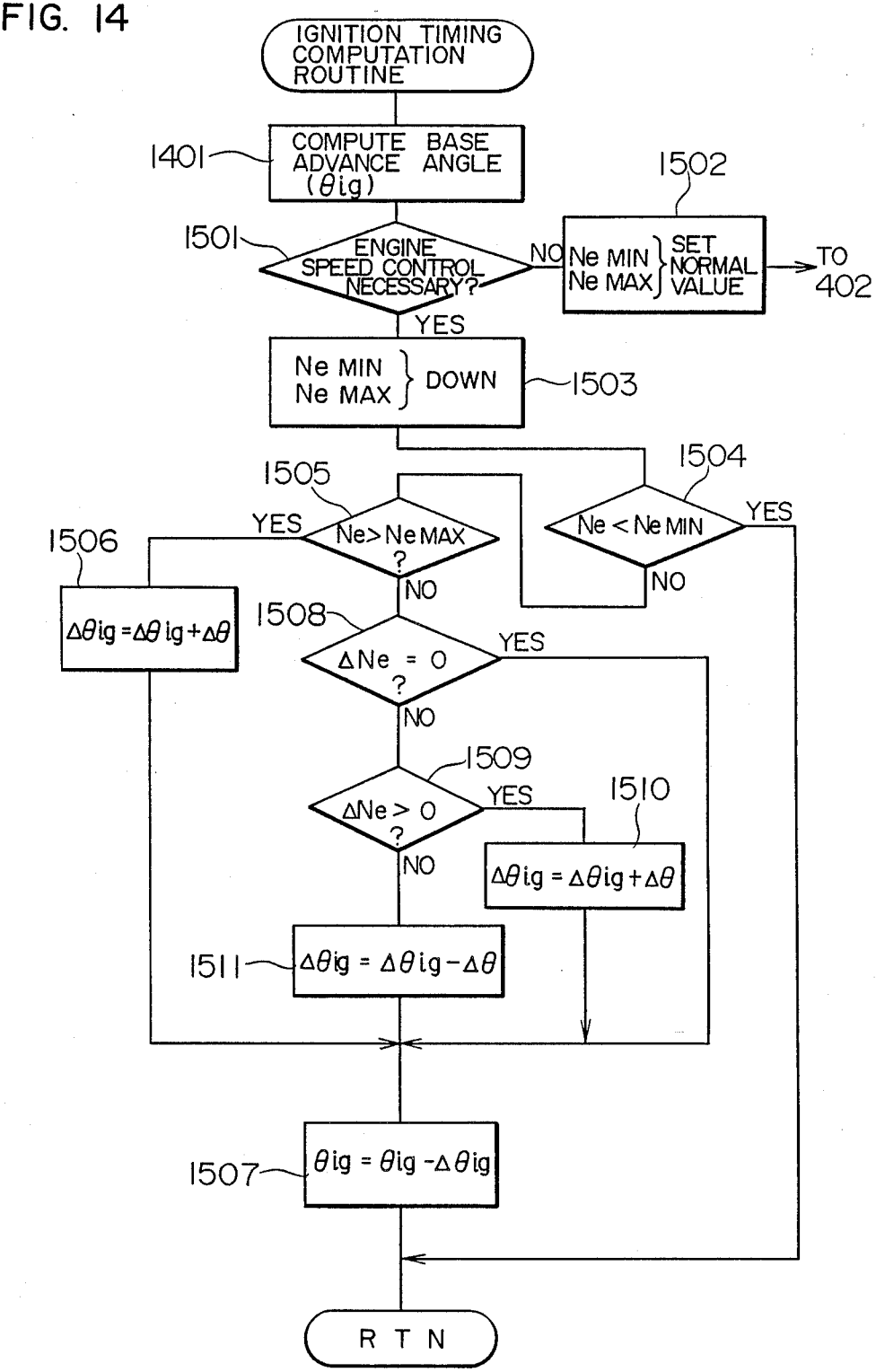
FIG. 14 is a flowchart for explaining the operation of an ignition timing control system according to a fourth embodiment of the present invention.

The foregoing explanation of embodiments concerns the over-revolutions preventing control. A similar control method, however, may be used for any other engine speed controls. If the engine develops a fault (such as when the engine is overheated and the engine cooling water increased in temperature beyond a setting is detected), for example, the engine speed may be controlled in a similar manner. In such a case, the set engine speed $Ne_{MIN}$ and $Ne_{MAX}$ providing an over-revolutions is lowered to a required engine speed level (such as by reducing $Ne_{MAX}$ to 200 rpm if the $Ne_{MAX}$ for normal conditions is 500 rpm), and further if the engine speed is higher than $Ne_{MAX}$, the retard angle is increased until the engine speed decreases into this range ($Ne_{MIN} < Ne < Ne_{MAX}$). When the engine speed is decreased into this range, the feedback control of ignition timing as in the present embodiment is executed. A flowchart for such an operation is shown in FIG. 14.

In the case where the engine develops a fault, such as when the engine is overheated with the engine cooling water temperature detected to have increased beyond a set value, the flag indicating the fault is turned on. Whether this flag is on (requiring the engine speed control) is decided at the ignition timing computation routine (step 1501), and if the flag is not on, step 1502 sets the engine speed setting $Ne_{MIN}$ and $Ne_{MAX}$ at a normal value, after which the process proceeds to step 1402 in FIG. 11 for effecting a control such as described with reference to the aforementioned embodiment. If the flag is on, on the other hand, step 1503 reduces the set engine speed $Ne_{MIN}$ and $Ne_{MAX}$ TO a required level, followed by step 1504. Step 1504 decides whether the engine speed is lower than the set level $Ne_{MIN}$, and if it is lower, the process is returned to the main route to set the ignition timing to the basic value $\theta_{ig}$. If step 1504 decides that the engine speed is higher than the set value $Ne_{MIN}$, by contrast, the process proceeds to step 1505. Step 1505 decides whether the engine speed is higher than the set level $Ne_{MAX}$, and if the decision is "Yes", step 1506 retards the retard angle $\Delta\theta_{ig}$ by $\Delta\theta$, followed by 1507 for setting the ignition timing to an angle retarded from the basic ignition timing while at the same time returning to the main route. If step 1505 decides as "No", that is, if the engine speed is lower than $Ne_{MAX}$, on the other hand, the process proceeds to step 1508. Step 1508 watches the engine speed change $\Delta Ne$, and if $\Delta Ne$ is zero, the process branches to step 1507. If it is not zero, step 1509 is followed. If $\Delta Ne$ is positive, the retard angle $\Delta\theta_{ig}$ is increased further by $\Delta\theta$ (step 1510) and the route is restored. If $\Delta Ne$ is negative, by contrast, the retard angle $\Delta\theta_{ig}$ is reduced by $\Delta\theta$ (step 1511), and the process returns to the main route. These processes are repeated to effect feedback control of the ignition timing until $\Delta Ne$ becomes zero in the range $Ne_{MIN} < Ne < Ne_{MAX}$.

Figure 10:
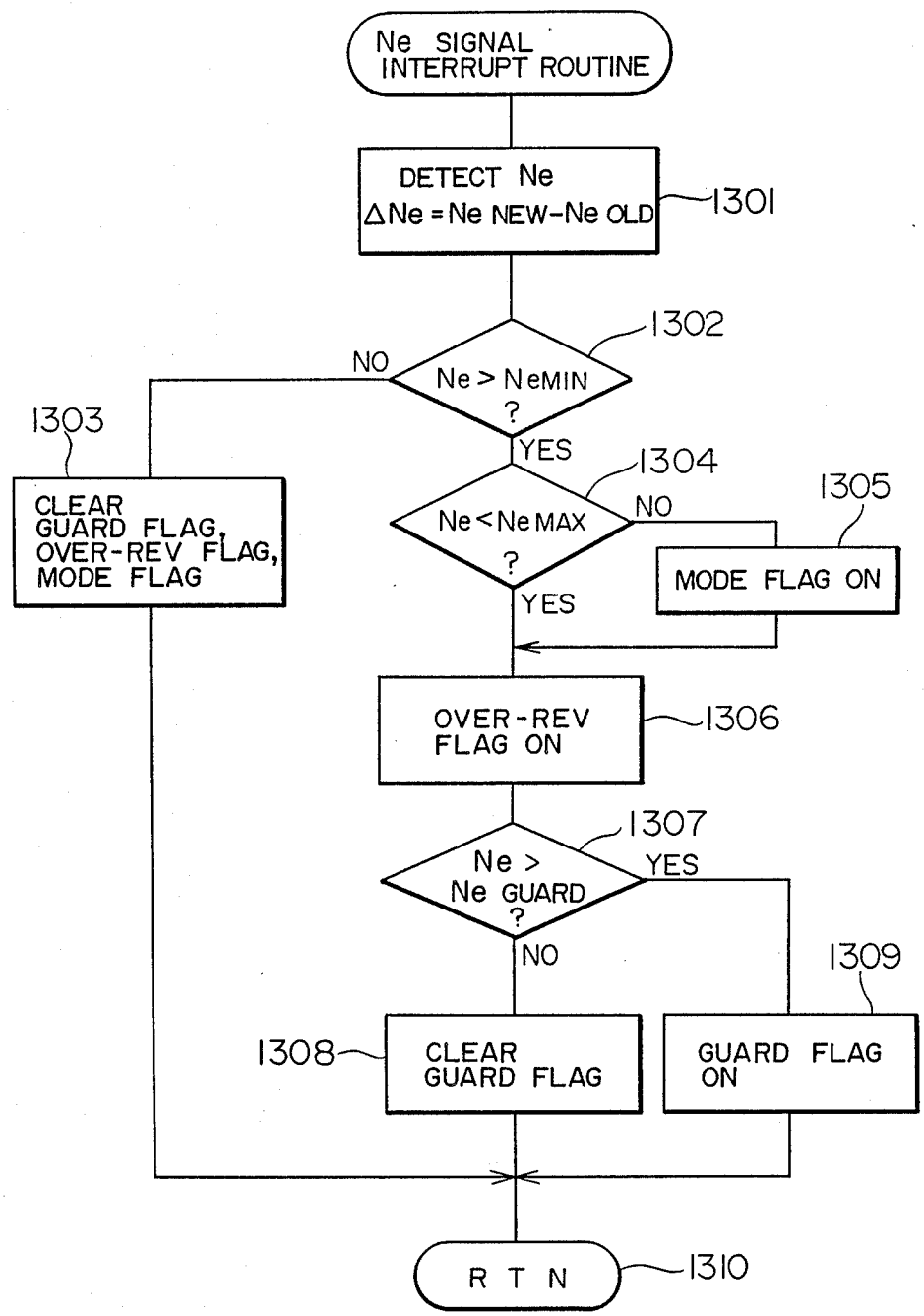

In the embodiment shown in FIG. 10, the engine speed at which the over-revolutions flag is turned off is set to a first engine speed, which is identical to the set speed for turning on the over-revolutions flag. For preventing hunting of ignition timing. However, the set engine where the flag is turned on may be lower than the first set engine speed. This action is taken easily by inserting another step of deciding an engine speed between steps 1302 and 1303 in FIG. 10.

Also, the first, second and third set engine speed may take any level, and to the extent that no backfire is caused, the retard angle of the second control range may be set to any value including zero. Further, the learning amount of ignition timing in the first control range may take any value according to the engine characteristics.

Although a target engine speed is not set within the first control range in the aforementioned embodiment, a control method may be used to set a target engine speed (such as by computing $\Delta Ne = Ne_{REF} - Ne$ with $\Delta Ne$ as a deviation from the target engine speed $Ne_{REF}$ in step 1301 of FIG. 10). Specifically, if the engine speed is lower than a target value in the first control range, the ignition timing is advanced, and vice versa, while if the engine speed is equal to the target, the particular retardation is held to hold the target engine speed. In the process, the learning amount of the ignition timing may be changed in accordance with whether the difference between the target value and engine speed is large or small. In place of this method, the retardation may be held when the engine speed ceases to change.

Instead of switching the control operation according to the range of engine speed in the embodiment described above, the control operation may be switched alternatively with the change rate of engine speed. Specifically, the rate of increase in engine speed is large, it is decided that the load is small and the second control method is executed to repeat the ignition stop and retardation, while if the engine speed increases at a smaller rate, a heavy load is decided to carry out the feedback control of the ignition timing.

The aforementioned embodiment refers to a case of the present invention applied to a four-cylinder gasoline engine with carburetor having a simultaneous ignition coil. Instead, the invention may be applied with equal effect to a gasoline engine of fuel injection type or another type of gasoline engine without any simultaneous ignition coil in which a single ignition coil is used with each cylinder or the secondary voltage generated in a single ignition coil is distributed to the spark plug of each cylinder through a distributor. Also, in these applications, the fewer chances of backfire eliminates the need of alternate repeated control with ignition stop and ignition timing retardation at the second set engine speed, and when continuous ignition stops may be effected in the region exceeding the second set engine speed.

We claim:

1. An ignition timing control system for an internal combustion engine for controlling ignition timing electronically in accordance with operating conditions of the internal combustion engines, comprising:
   means for stopping an ignition operation;
   means for retarding an ignition timing; and
   engine speed-responsive control means for controlling said ignition stopping means and said ignition retarding means, such that (a) said ignition stopping means stops ignitions successively as many times as a number of cylinders in said engine, and (b) then said ignition retarding means retards the ignition timing successively at least as many times as said number of cylinders when an engine speed is in a set range.

2. An ignition timing control system for a multicylinder internal combustion engine that has a plurality N of cylinders comprising an ignition system of electronic distribution type including a carburetor and a simultaneous ignition coil for controlling ignition timing in accordance with operating conditions of the internal combustion engines, the ignition timing control system comprising:
means for stopping an ignition operation;
means for retarding an ignition timing; and
engine speed-responsive control means for controlling said ignition stopping means to successively stop ignition operation for a number of times corresponding to said number N of cylinders and for controlling, alternately to said controlling of said ignition stopping means, the ignition timing retarding means to retard the ignition by a number of times predetermined by said number N of cylinders, when the engine speed is in a set range.

3. An ignition timing control system for an internal combustion engine for controlling ignition timing electronically in accordance with operating conditions of the internal combustion engine, comprising:
means for detecting an engine speed of the internal combustion engine;
ignition timing angle retarding control means for retarding ignition timing by a predetermined amount using a feedback control, in accordance with the engine speed of the internal combustion engine, when the engine speed of the internal combustion engine detected by the engine speed detection means undergoes change in a range exceeding a first set value but below a second set value, whereby with the change in engine speed in the range, the ignition timing retardation angle is increased in response to an increase in engine speed, and the ignition timing retardation angle is decreased in response to a decrease in engine speed; and
means for stopping an ignition operation when the engine speed of the internal combustion engine exceeds said second set value higher than the first set value.

4. A system according to claim 3, wherein said ignition stopping means stops the ignition operation intermittently.

5. A system according to claim 4, wherein the ignition stopping means stops said ignition for successive ignition operation stops as many times as a number of cylinders of the engine and said retarding control means operates for successive ignitions as many times as at least the number of cylinders.

6. A system according to claim 5, wherein the ignition timing is set to a retarded value when the ignition stop means is in operation.

7. A system according to claim 3, wherein said ignition timing angle retardation control means changes the amount of ignition timing angle retardation in accordance with a change between the previous detected engine speed and the presently detected engine speed.

8. A system according to claim 3, wherein said ignition timing angle retardation control means changes the ignition timing retardation in accordance with a change in the detected engine speed as compared with a target engine speed.

9. An ignition timing control system for multi-cylinder internal combustion engine comprising an ignition system of an electronic distribution type with a carburetor and a simultaneous ignition coil for controlling ignition timing electronically in accordance with operating conditions of the internal combustion engine, said ignition timing control system comprising:
means for detecting engine speed of the internal combustion engine;
ignition timing retardation control means for controlling by feedback to cause a predetermined amount of ignition timing retardation in accordance with the engine speed of the internal combustion engine when the engine speed of the internal combustion engine detected by the engine speed detection means undergoes a change only in a range exceeding a first set value, whereby with the change in engine speed in the range, the ignition timing retardation is increased in response to an increase in engine speed, and the ignition timing retardation is reduced in response to a decrease in engine speed; and
ignition stopping means for stopping an ignition operation when the engine speed of the internal combustion engine exceeds a second set value higher than the first set value.

10. A system according to claim 9, wherein said ignition stopping means stops the ignition operation intermittently.

11. A system according to claim 10, wherein said ignition stopping means stops said ignition for as many successive ignition stops as a number of cylinders of the internal combustion engine, and said retardation control means operates for as many successive ignitions as at least the number of cylinders.

12. A system according to claim 10, wherein the ignition timing is set to a retarded angle when the ignition stop means is in operation.

13. A system according to claim 9, wherein said ignition timing retardation control means changes the ignition timing retardation in accordance with a change between the previously detected engine speed and the presently detected engine speed.

14. A system according to claim 9, wherein said ignition timing retardation control means changes the ignition timing retardation in accordance with the level of the detected engine speed as compared with a target engine speed.

15. A method of ignition timing control for internal combustion engine, comprising the steps of:
detecting an engine speed of a multi-cylinder internal combustion engine;
sequentially stopping ignition operations of the cylinders of the multi-cylinder internal combustion engine when the engine speed increases beyond a predetermined engine speed level;
sequentially and continually retarding the ignition timings of the cylinders cyclically over at least one cycle after the sequential stop of ignitions for all the cylinders has been completed; and
repeating the step of ignition stop and the step of ignition timing retardation as long as the engine speed is higher than a predetermined engine speed level.

16. A method of controlling the ignition timing of internal combustion engines comprising the steps of:
detecting engine speed of an internal combustion engine;
controlling the ignition timing retardation by feedback in such a manner that when the engine speed is higher than a predetermined first engine speed level, the ignition timing retardation is increased in response to an upward change in engine speed, and the ignition timing retardation is reduced in response to a downward change in engine speed; and alternating ignition stops with ignition timing retardations when the engine speed is higher than a predetermined second engine speed level higher than the first engine speed level.

17. A system according to claim 5 further comprising: means for detecting an abnormality in the engine; and means for lowering the first set value to a required value of engine speed in response to said detecting means detecting said engine abnormality.

* * * * *